United States Patent [19]

Felber et al.

[11] 4,201,089

[45] May 6, 1980

[54] TEMPERATURE MEASURING DEVICE FOR TRANSFORMERS AND REACTORS

[75] Inventors: Willibald Felber; Elmar Woschnagg, both of Weiz, Austria

[73] Assignee: Elin-Union Aktiengesellschaft, Vienna, Austria

[21] Appl. No.: 840,675

[22] Filed: Oct. 11, 1977

[30] Foreign Application Priority Data

Oct. 8, 1976 [AT] Austria .................................. 7480/76

[51] Int. Cl.[2] ................................................ G01K 1/20

[52] U.S. Cl. ..................................... 73/350; 73/362 R

[58] Field of Search ................... 73/350, 362 R, 362.4, 73/362.5, 371, 368, 368.1

[56] References Cited

U.S. PATENT DOCUMENTS

| | | | |
|---|---|---|---|
| 1,879,276 | 9/1932 | Isaac | 73/350 |
| 3,190,122 | 6/1965 | Edwards | 73/371 |

FOREIGN PATENT DOCUMENTS

| | | | |
|---|---|---|---|
| 256505 | 8/1967 | Austria . | |
| 1270835 | 6/1968 | Fed. Rep. of Germany . | |
| 452691 | 3/1968 | Switzerland . | |
| 323408 | 1/1930 | United Kingdom | 73/350 |

*Primary Examiner*—Donald O. Woodiel
*Attorney, Agent, or Firm*—Ernest F. Marmorek

[57] ABSTRACT

A thermometer for measuring the temperature of at least one selected portion of an electrically-operated device disposed in a container includes a first upwardly extending conduit adapted to communicate interiorly with the container, and an indicating capacitor defining a first chamber communicating with the first conduit. The indicating capacitor includes a first dielectric material, and a first electrically non-conducting liquid having a predetermined coefficient of thermal expansion; the first liquid is adapted to be disposed at least in part in the container, and at least in part in the first chamber and the first conduit, so that at least a portion of the first dielectric material is constituted by a portion of the first liquid. A reference capacitor defines a second chamber, and includes a second dielectric material. A second electrically non-conducting liquid has substantially the predetermined coefficient of thermal expansion, and is disposed at least in part in the second chamber, and in a second conduit communicating with the second chamber, the second conduit being closed at one end thereof. Any change in temperature in the first liquid will therefore result in a change of the volume thereof in the first chamber, and hence in the capacity of the indicating capacitor, so that any operative difference of the capacities of the capacitors will be proportional to any temperature change of the selected portion of the device.

10 Claims, 1 Drawing Figure

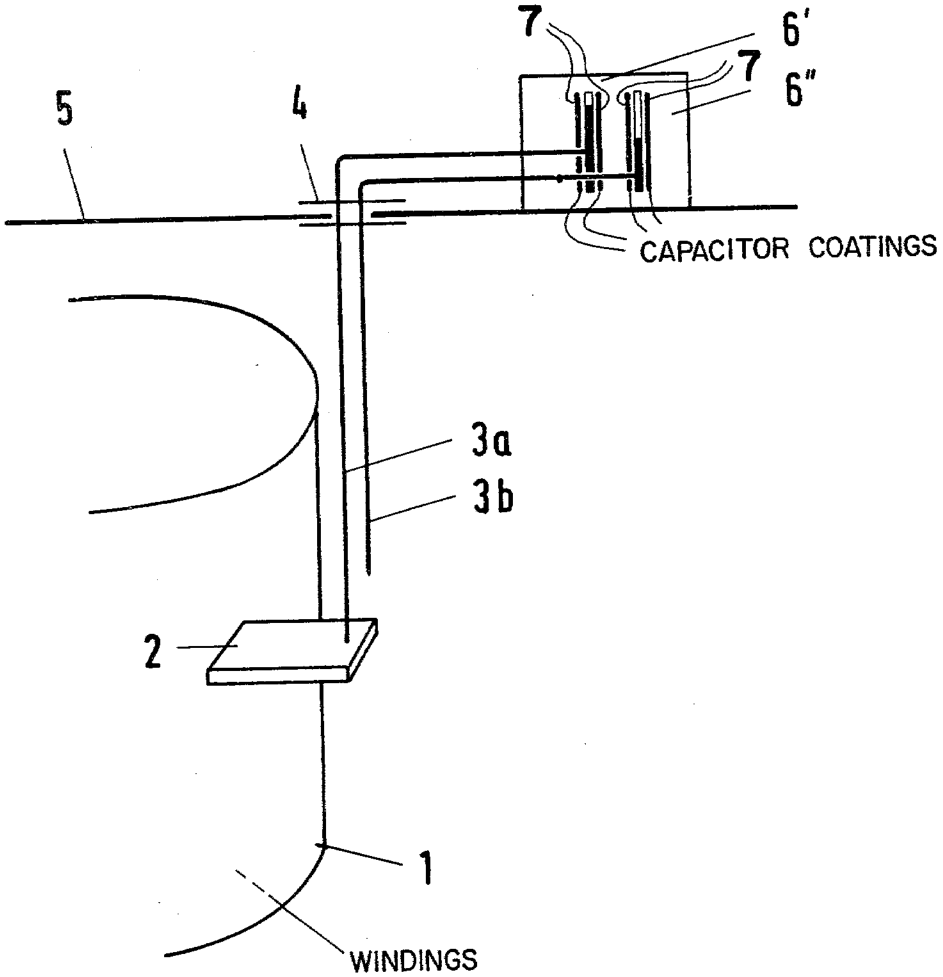
7
6′
7
6″
5
4
CAPACITOR COATINGS
3a
3b
2
1
WINDINGS

TEMPERATURE MEASURING DEVICE FOR TRANSFORMERS AND REACTORS

BACKGROUND OF THE INVENTION

This invention relates to a temperature measuring device for transformers and choke coils, particularly for those parts thereof which are subjected to a voltage, in which device the heat sensing element used is an oil-filled chamber, which is in good thermal contact with the part whose temperature is to be monitored, and from which at least one pipe, in the form of a rising pipe, passes through the lid of the transformer.

Of particular concern in the construction and operation of transformers is the mastering of the heating problems which govern the life of the oil and solid insulation, it being particularly desirable to be able to monitor the temperature of those parts of a winding which are particularly endangered from the thermal point of view by so-called hot spots. The main difficulty in connection with this temperature monitoring consists in that winding parts under high tension have to be thermally monitored, that is to say parts for which customary temperature sensing means in which the sensor is a resistance element cannot be used.

The methods described below have hitherto been applied for this purpose, one of them also being included in the patent literature (Austrian Patent Specification No. 256,505, German Patent Specification No. 1,270,835, Swiss Patent Specification No. 452,691, and a number of additional corresponding patents). The measuring sensing means comprises flat chambers of insulating material which are inserted into the cooling ducts of the winding with good thermal contact for the purpose of insulating the parts of the winding which are to be monitored, these ducts being in communication with the oil of the cooling duct and being connected by way of a flexible insulating tube to a chamber lying outside the high-tension zone and containing a thermocouple. At predetermined intervals of time the oil is drawn off from the chamber in question by means of a pump, this being effected so rapidly that the oil reaches the thermocoule practically without cooling, so that the temperature of the oil in the chamber can be measured. Another proposal consists in utilising the dependence on temperature of the resonant frequency of a quartz crystal, which is in good thermal contact with the winding part which is to be monitored, for controlling an RC oscillator, whose amplified output feeds a transducer radiating ultrasonic signals, which are received by a receiver provided on the wall of the transformer tank, and converted into an indication of temperature. According to a third proposal the temperature sensing means provided is a thermistor, which controls the output of an oscillator associated with it. This oscillator in turn modulates the frequency of another oscillator, which is controlled by a quartz crystal and whose output is radiated through an antenna. A receiving antenna mounted on the wall of the tank is connected to a frequency-current transformer whose output feeds a temperature indicator (Electrical Review, June 7, 1974, p. 647 to 650). Finally, in connection with the prior art mention may also be made of the direct measurement of the maximum oil temperature with the aid of a teflon tube provided at the top end of a transformer winding. This teflon tube is closed at one end, while its other end leads into a thinner teflon tube passing through the transformer tank. The entire teflon tube is filled with a predetermined volume of oil, which in consequence of its position in the uppermost part of the transformer tank participates in the temperature fluctuations of the hottest transformer oil. The resulting level fluctuations in the part of the teflon tube which passes through the transformer tank, or the resulting fluctuations in pressure at the end of the said tube, serve as an indication of the temperature of the oil in the uppermost part of the transformer tank and enable conclusions to be reached with regard to the thermal loading of the transformer (see CIGRE International Conference on Large High Tension Electric Systems), 1972 Session, Aug. 28–Sept. 6, Paper 12-02 "Hot spot and top-oil temperatures. Proposal for a modified heat specification for oil immersed power transformers").

A temperature measuring device of the kind first defined above is known from German Patent Specification No. 526,732. In present-day technology, however, this temperature measuring device can no longer be used, particularly because the amount of oil required for this measuring process is very great, so that the dimensions of the oil tank would also have to be of corresponding size. However, with the gap width between coils customary at the present time, a large oil tank can no longer be installed. That a relatively large amount of oil is used in this method of measurement is clear from the fact that the amount of oil present in the oil tank must be far greater, than that present in the rising pipe, since otherwise the error which would be included in the result of the measurement because of the expansion of the oil in the rising pipe would no longer be acceptable.

The invention seeks to take into account the existence of small gap widths, and nevertheless to provide a reliable method of measurement. A temperature measuring device of the kind first defined above is characterized, according to the present invention, in that at least one additional oil-filled pipe, which at its end near the chamber is closed directly upstream of the chamber, is guided parallel to the aforesaid pipe, and that the oil taken out of the transformer tank by means of these two pipes constitutes the dielectric of two preferably cylindrical capacitors whose capacitances, which vary with the fluctuations of level of the dielectric, can be compared with one another and used to measure the temperature.

With the temperature measuring device of the invention it is possible, for the first time to enable the amount of oil in the oil tank to be designed independently of the amount of oil contained in the pipes, since the expansion of the oil in the pipe has no influence on the final result of the measurement. The expansion of the oil in the rising pipe is measured by the amount of oil contained in the second, parallel pipe and is deducted by the external measuring device.

Another advantage of the invention is to be seen in that, because of the small size of the oil tank the temperature pattern is not disturbed and the winding filling factor is not changed.

BRIEF DESCRIPTION OF THE DRAWING

The proposal of the invention for hot spot temperature monitoring will be explained more fully below with reference to the accompanying sole FIGURE of the drawing.

DESCRIPTION OF THE PREFERRED EMBODIMENTS

In the drawing, 1 indicates very diagrammatically the transformer winding, which is usually a pancake winding provided with radial and axial cooling gaps, and 2 a heat sensing means which is made in chamber form in a manner known per se, and which is disposed in a part of the winding which is particularly endangered from the thermal point of view, similarly to a spacer, in a radial or axial cooling duct with good thermal contact with the insulation of the winding.

In contrast to the chamber provided in accordance with Austrian Patent Specification No. 256,505 this chamber is closed in relation to the transformer oil surrounding it, but from it a flexible pipe **3*a* leads through the lid of the transformer into a preferably cylindrical space 6' situated between two capacitor coatings. A flexible pipe 3*b* of the same cross-section, but closed at its end near the chamber, extends parallel to the flexible pipe 3*a*. The pipe 3*b* also passes through the lid of the transformer and leads into a preferably cylindrical space 6" situated between two capacitor coatings 7**. Both flexible pipes are filled with oil, the level of oil extending into the aforesaid cylindrical spaces of the two capacitors. The oil in the flexible pipes thus forms the dielectric for these capacitors, this dielectric having a level which fluctuates with the temperature of the hot spot and in part also with the average temperature of the transformer oil.

The mode of operation of the device of the invention for hot spot temperature monitoring is as follows. The oil enclosed in the chamber 2 will assume practically the temperature of the neighbouring winding copper. The oil in the two flexible pipes assumes the temperature of the transformer oil surrounding it. If therefore the cylindrical spaces of the two capacitors had the same levels when the transformer was in the cold state, these levels will differ from one another during operation because the oil in the chamber assumes a higher temperature and accordingly expands to a greater extent than the columns of oil in the two flexible pipes **3*a* and 3*b* which are exposed to the average oil temperature. The fluctuating levels of the dielectric in the two capacitors naturally also entail fluctuating capacitance values of the capacitors, and in a manner self-suggesting to the specialist these values can be compared with one another, for example in a bridge circuit, the difference between them constituting a measure of the difference between the temperature of the hot spot, and the average temperature of the transformer oil, so that it can be used for indicating the hot spot temperature and/or for giving a signal indicating dangerous overheating. As will readily be appreciated, the pipe 3*b* serves to compensate for the expansion of oil occurring in the pipe 3*a*** as the result of fluctuations of the oil temperature.

What we claim is:

1. A thermometer for measuring the temperature of at least one selected portion of an electrically-operated device disposed in a container, comprising in combination:

a first electrically non-conducting liquid, having a predetermined coefficient of thermal expansion, in good thermal contact with the selected portion of said electrically-operated device, and adapted to be disposed in said container, a first upwardly extending conduit adapted to communicate interiorly with said container, a portion of said first liquid occupying said first conduit, an indicating capacitor defining a first chamber communicating with said first conduit, said indicating capacitor including a first dielectric material, at least a portion of said first dielectric material being constituted by another portion of said first liquid, a second electrically non-conducting liquid, having substantially said predetermined coefficient of thermal expansion, a second conduit closed at one end thereof, a portion of said second liquid occupying said second conduit, and a reference capacitor defining a second chamber communicating with said second conduit, said reference capacitor including a second dielectric material, at least a portion of said second dielectric material being constituted by another portion of said second liquid, whereby any change in temperature in said first liquid will result in a change of the volume of said first liquid in said first chamber, so that any operative difference of the capacities of said indicating and reference capacitors will be proportional to any temperature change of the selected portion of said electrically-operated device.

2. A thermometer as claimed in claim 1, wherein said first and second liquids are oil.

3. A thermometer as claimed in 1, wherein said electrically-operated device is a transformer, and wherein said conduits are adapted to pass through a cover of said vessel.

4. A thermometer as claimed in claim 1, wherein said conduits are disposed substantially parallel to one another.

5. A thermometer as claimed in claim 1, wherein each of said chambers of a corresponding capacitor has a cylindrical shape.

6. A thermometer as claimed in claim 1, wherein said capacitors are disposed remotely from said electrically-operated device.

7. A thermometer for measuring the temperature of at least one selected portion of an electrically-operated device disposed in a container, comprising in combination:

A. a first upwardly extending conduit adapted to communicate interiorly with said container, B. an indicating capacitor defining a first chamber, communicating with said first conduit, said active capacitor including a first dielectric material, C. a first electrically non-conducting liquid having a predetermined coefficient of thermal expansion and being adapted to be disposed (a) at least in part in said container so as to be in good thermal contact with the selected portion of said electrically-operated device, (b) at least in part in said first chamber so that at least a portion of said first dielectric material is constituted by the part of said first liquid, and (c) in said first conduit so as to insulate electrically said indicating capacitor from said electrically-operated device, D. a reference capacitor defining a second chamber and including a second dielectric material, a second conduit closed at one end thereof and communicating with said second chamber, and E. a second electrically non-conducting liquid having substantially said predetermined coefficient of thermal expansion, and being disposed at least in part in said second chamber so that at least a portion of said second dielectric material is constituted by the part of said second liquid, and disposed at least in part in said second conduit, whereby any change in temperature in said first liquid will result in a change of the volume of said first liquid in said first chamber, and hence in the capacity of said indicating capacitor, so that any operative difference of the capacities of said indicating and reference capacitors, will be proportional to any temperature change of the selected portion of said electrically-operated device.

8. In a method of measuring the temperature of at least one selected portion of an electrically-operated device with the aid of a vessel, a first upwardly extending conduit communicating with the vessel, an indicating capacitor having the shape of a first chamber communicating with the first conduit, a second conduit closed at one end thereof, and a reference capacitor having the shape of a second chamber communicating with the second conduit, the steps comprising:

at least partially filling the first chamber, the first conduit, and the vessel with a predetermined quantity of a first electrically non-conducting liquid, so as to immerse the selected portion of the electrically-operated device in the first liquid, the first liquid having a predetermined coefficient of thermal expansion, being in good thermal contact with the selected portion of the electrically-operated device, and a portion thereof acting as a dielectric material in the indicating capacitor, at least partially filling the second chamber, and the second conduit, with a second electrically non-conducting liquid, the second electrically non-conducting liquid having substantially said predetermined coefficient of thermal expansion, and another portion thereof acting as a dielectric material in the reference capacitor, measuring the capacities of the indicating and the reference capacitors, and obtaining the difference between said indicating and reference capacities, whereby any change in temperature in the first liquid will result in a change of the volume of the first liquid in the first chamber, and hence in the capacity of the indicating capacitor, so that any operative difference of the capacities of said indicating and reference capacitors will be proportional to any temperature change of the selected portion of the electrically-operated device.

9. A method as claimed in claim 8, wherein the liquids include oil, and, further comprising the steps of passing the conduits through a cover of the vessel, and of disposing the conduits substantially parallel to one another.

10. A method as claimed in claim 8, further comprising the step of disposing the capacitors remotely from the electrically-operated device.

* * * * *